United States Patent Office 2,849,461
Patented Aug. 26, 1958

2,849,461
METHOD FOR PREPARING 19-NOR, 17-α-ALKYL TESTOSTERONE

Pietro de Ruggieri, Milan, Italy

No Drawing. Application April 16, 1957
Serial No. 653,059

2 Claims. (Cl. 260—397.4)

As starting materials for the preparation of this important class of therapeutically and biologically interesting products I employ the 3-derivatives of the 17-cyanohydrin of 19-nor,androstenediones and particularly 3-ethoxy-,17-cyano,17-ol,estra,3-5-diene and 3-ethylendioxy,17-cyano,17-ol,estra-5-ene both described in my co-pending patent application S. N. 653,060 and S. N. 653,078, each filed April 16, 1957.

After reacting a solution of the aforementioned cyanohydrin with an ethereal solution of an alkyl (where alkyl is a 1 to 4 carbon atoms radical) and magnesium halide (bromide or iodide) on decomposition of the excess alkyl magnesium halide by dilute HCl 19-nor,17-α-alkyl testosterone are directly obtained.

By this procedure are prepared: 19-nor,17-α-methyl testosterone (melting point 156°–157°); 19-nor-17-α-ethyl testosterone (melting point 140°–141°); 19-nor,17-α-propyl testosterone (M. P. 121°–122°) and 19-nor,17-α-butyl testosterone (M. P. 128°).

Examples (1) To a solution of 10 parts of 3-ethoxy,17-cyano,17-ol, estra,3-5-diene in 200 parts of anhydrous benzene are added 35 parts of methyl magnesium bromide in 150 parts of anhydrous ethyl ether and the resulting mixture is refluxed for two hours in a nitrogen atmosphere, then poured into ice and made acidic with 50% hydrochloric acid. After stirring for 1–2 hours at room temperature and in a nitrogen atmosphere, the organic layer is decanted, the water layer is repeatedly extracted with a 50:50 ether-benzene mixture and the combined extracts are washed with water to neutrality, dried on anhydrous sodium sulphate and evaporated to dryness under reduced pressure.

The crystalline residue is digested by refluxing with a 2:1 ether-hexane mixture, then cooled in an icebox and filtered.

8.3 parts are obtained of 17-α-methyl,19-nor testosterone melting at 152–155°

$\lambda_{max}^{EtOH}$ at 240 m$\mu$: log $\epsilon$=4.2

The recrystallized product melts at 156°–157°.

(2) The same procedure is followed as in Example 1 except that 3-ethylendioxy,17-cyano-17-ol,estra-5-ene is used instead of 3-ethoxy,17-cyano,17-ol,estra-3-5-diene.

(3) To a solution of 10 parts of 3-ethylendioxy,17-cyano,17-ol,estra-5-ene in 200 parts of anhydrous benzene are added 50 parts of ethyl magnesium iodide in 150 parts of anhydrous ether and the resulting mixture is refluxed for 3 hours in a nitrogen atmosphere, then poured into ice and made acidic with 50% hydrochloric acid. After stirring two hours at room temperature and in a nitrogen atmosphere the organic layer is decanted, the water layer is repeatedly extracted with a 50:50 ether-benzene mixture and the combined extracts are washed with water to neutrality, dried on anhydrous sodium sulphate and evaporated to dryness under reduced pressure. Crystallisation of the residue from methanol yields 17-α-ethyl,19-nor testosterone melting at 140°–141°.

$\lambda_{max}^{EtOH}$ at 240 m$\mu$: log $\epsilon$=4.2

(4) The same procedure is followed as in Example 3 except that 3-ethoxy,17-cyano,17-ol,estra-3-5-diene is used instead of 3-ethylendioxy,17-cyano,17-ol,estra-5-ene.

I claim:
1. A method of preparing 19-nor-17-α-alkyl testosterone comprising the steps of reacting compounds selected from the group consisting of 3-ethoxy-17-cyano-17-ol-estra-3-5-diene or 3-ethylendioxy-17-cyano-17-ol-estra-5-ene with an excess of an alkyl magnesium halide and of decomposing the product by hydrochloric acid.
2. A method in accordance with claim 1, wherein said alkyl magnesium halide includes a compound selected from the group of alkyl magnesium bromide and alkyl magnesium iodide, the alkyl radical of which has from one to four carbon atoms.

References Cited in the file of this patent
UNITED STATES PATENTS
2,660,586    Murray _____ Nov. 24, 1953